United States Patent [19]

Kayane et al.

[11] Patent Number: 4,937,326
[45] Date of Patent: Jun. 26, 1990

[54] REACTIVE SCARLET DYES HAVING BOTH MONOCHLOROTRIAZINYL AND VINYLSULFONE TYPE REACTIVE GROUPS LINKED VIA N-ALKYLATED AMINO

[75] Inventors: Yutaka Kayane, Sakai; Masaki Sunami, Toyonaka; Katsumasa Otake, Nara; Yasuo Tezuka, Ibaraki, all of Japan

[73] Assignee: Sumitomo Chemical Company, Limited, Osaka, Japan

[21] Appl. No.: 714,361

[22] Filed: Mar. 22, 1985

Related U.S. Application Data

[63] Continuation of Ser. No. 553,422, Nov. 18, 1983, abandoned, which is a continuation of Ser. No. 321,892, Nov. 16, 1981, abandoned.

[30] Foreign Application Priority Data

Nov. 26, 1980 [JP] Japan .................. 55-167084
Feb. 23, 1981 [JP] Japan .................. 56-25755

[51] Int. Cl.$^5$ .................. C09B 62/04; C09B 62/44; C09B 62/443; D06P 1/38
[52] U.S. Cl. .................. 534/638; 534/617; 534/629
[58] Field of Search .................. 534/638, 632, 617, 642, 534/622

[56] References Cited

U.S. PATENT DOCUMENTS

| | | | |
|---|---|---|---|
| 3,223,470 | 12/1965 | Boedever et al. | 534/638 X |
| 3,455,897 | 7/1969 | Barben | 534/638 X |
| 4,072,463 | 2/1978 | Schlafer et al. | |
| 4,341,699 | 7/1982 | Tezuka et al. | 534/638 X |

FOREIGN PATENT DOCUMENTS

| | | | |
|---|---|---|---|
| 2437426 | 4/1980 | France | 534/638 |
| 410237 | 10/1966 | Switzerland | 534/638 |
| 2026527 | 2/1980 | United Kingdom | 534/638 |
| 2034343 | 6/1980 | United Kingdom | 534/638 |

OTHER PUBLICATIONS

The Merck Index, 9th Edition, 1976, #692, #5892, #3223.
Basic Principles of Organic Chemistry, Benjamin, Inc., N.Y. 1964, p. 643.

*Primary Examiner*—Floyd D. Higel
*Attorney, Agent, or Firm*—Stevens, Davis, Miller & Mosher

[57] ABSTRACT

A novel reactive monoazo dye, which can give to cellulose fiber materials a deep orange to scarlet color superior in build-up property and chlorine fastness, represented by a free acid of the formula,

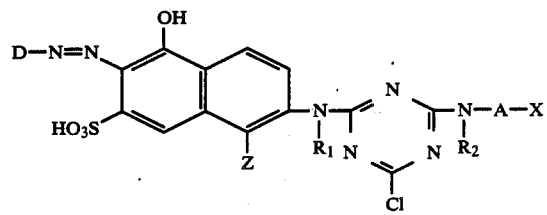

wherein D is a phenyl group substituted with 1 to 3 substitutes selected from methyl, ethyl, methoxy, ethoxy, halogen, acetylamino, propionylamino, benzoylamino, succinylamino, maleinylamino, nitro, sulfonic acid and carboxyl groups; $R_1$ is a hydrogen atom, or a methyl or ethyl group; $R_2$ is an alkyl group having 1 to 4 carbon atoms which is unsubstituted or substituted with a hydroxy, cyano, alkoxy, halogen, carboxy, alkoxycarbonyl or sulfonic acid group; Z is a hydrogen atom or a sulfonic acid group; A is a phenylene residue which is unsubstituted or substituted with 1 or 2 substituents selected from methyl, ethyl, methoxy, ethoxy, chlorine, bromine and sulfonic acid groups; or a naphthylene residue which is unsubstituted or substituted with one sulfonic acid group; and X is $-SO_2CH=CH_2$ or $-SO_2CH_2CH_2Y$ in which Y is a group which is splittable by alkalis.

11 Claims, No Drawings

REACTIVE SCARLET DYES HAVING BOTH MONOCHLOROTRIAZINYL AND VINYLSULFONE TYPE REACTIVE GROUPS LINKED VIA N-ALKYLATED AMINO

This application is a continuation of application Ser. No. 553,422, filed Nov. 18, 1983, now abandoned which in turn was a continuation of application Ser. No. 321,892, filed Nov. 16, 1981, now abandoned.

The present invention relates to novel reactive monoazo dyes, their production, and dyeing of cellulose fiber materials with them.

It is well known that dyes having a $\beta$-sulfatoethylsulfonyl group or so-called vinylsulfone type reactive dyes are used for dyeing cellulose fiber materials. But, products dyed with orange to scarlet azo reactive dyes of this kind are not deep in color because of the poor build-up property of the dyes, and also, the dyed products are generally low in chlorine fastness so that they often experience discoloration due to chlorine in city water.

Dyes having a monochlorotriazinyl group are also known. Generally, however, these reactive dyes require high temperatures for dyeing and lack exhaustion dyeing ability. Accordingly, they are only used for printing. Besides, the products dyed with the dyes of this kind are low in acid stability. Thus, the dyes of this kind ae not always satisfactory in practical use. For example, the following dyes are disclosed in U.S. Pat. No. 3,223,470:

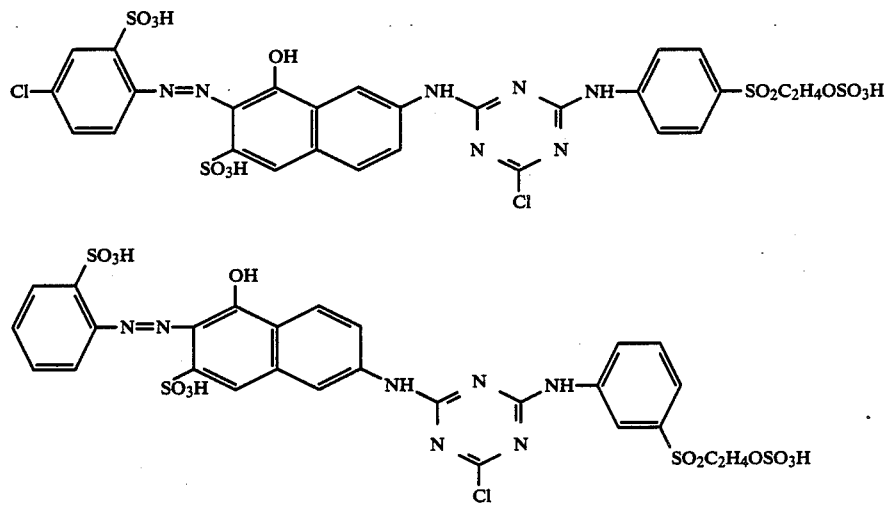

However, these dyes are not satisfactory in solubility, build-up property, washing-off property or the like.

For the reasons described above, the inventors extensively studied to obtain orange to scarlet reactive dyes particularly superior in build-up property and chlorine fastness. As a result, it was found that specified monoazo dyes having as reactive groups both $\beta$-sulfatoethylsulfonyl and monochlorotriazinyl groups give dyed products of deep orange to scarlet color superior in chlorine fastness.

The present invention provides a compound represented by a free acid of the formula (I),

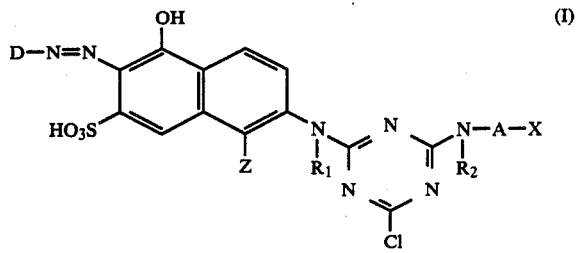

wherein D is a phenyl group substituted with 1 to 3 substituents selected from methyl, ethyl, methoxy, ethoxy, halogen, acetylamino, propionylamino, benzoylamino, succinylamino, maleinylamino, nitro, sulfonic acid and carboxyl groups; $R_1$ is a hydrogen atom, or a methyl or ethyl group; $R_2$ is an alkyl group having 1 to 4 carbon atoms which is unsubstituted or substituted with a hydroxy, cyano, alkoxy, halogen, carboxyl, alkoxycarbonyl or sulfonic acid group; Z is a hydrogen atom or a sulfonic acid group; A is a phenylene residue unsubstituted or substituted with 1 or 2 substituents selected from methyl, ethyl, methoxy, ethoxy, chlorine, bromine and sulfonic acid groups, or a naphthylene residue unsubstituted or substituted with one sulfonic acid group; and X is $-SO_2CH=CH_2$ or $-SO_2CH_2CH_2Y$ in which Y is a group which is splittable by alkalis.

Among the compounds of the formula (I), preferred are those having hydrogen atoms for $R_1$ and Z in the formula (I), and more specifically, those having the following formula,

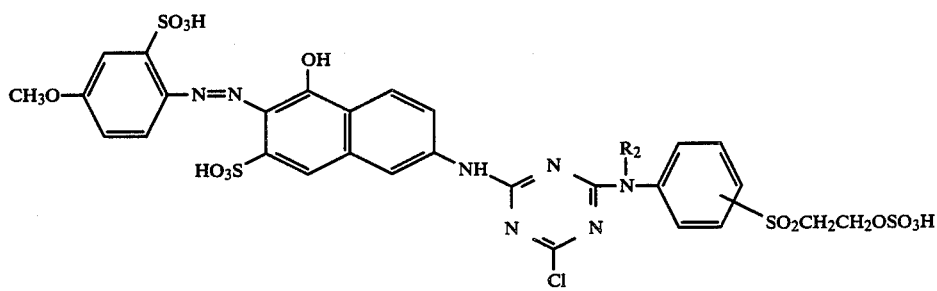

wherein $R_2$ is as defined above, preferably methyl, ethyl, n-propyl or 2-hydroxy ethyl groups.

Specific examples of the symbol Y when X in the formula (I) is $-SO_2CH_2CH_2Y$, include sulfate, phosphate and acetate groups and halogen atoms.

The present invention also provides a method for producing the compound represented by the formula (I), which comprises (1) subjecting cyanuric chloride to first-step condensation with a monoazo compound of the formula (IV),

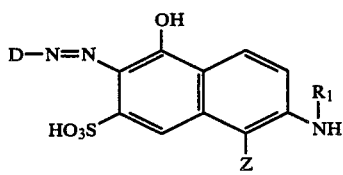
(IV)

wherein D, $R_1$ and Z are as defined above, and then to second-step condensation with a compound of the formula (V), $$\overset{R_2}{\underset{|}{HN}}-A-X \qquad (V)$$

wherein $R_2$, A and X are as defined above, or (2) subjecting cyanuric chloride to first-step condensation with the compound of the formula (V) and then to second-step condensation with the monoazo compound of the formula (IV), or (3) condensing cyanuric chloride with a compound of the formula (III),

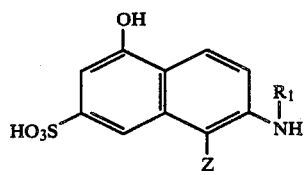
(III)

wherein $R_1$ and Z are as defined above, and the compound of the formula (V) in optional order to obtain a monochlorotriazinyl compound of the formula (VI),

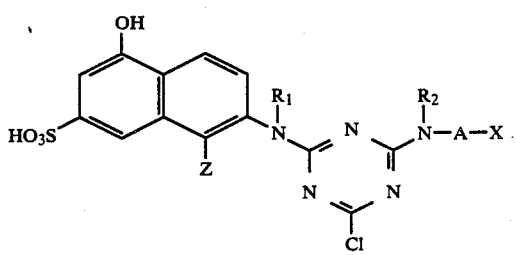
(VI)

wherein $R_1$, $R_2$, Z, A and X are as defined above, and then coupling the compound (VI) with a diazonium salt of an aromatic amine of the formula (II), $$D-NH_2 \qquad (II)$$

wherein D is as defined above, or (4) subjecting cyanuric chloride to first-step condensation with the compound of the formula (III), coupling the resulting compound with the diazonium salt of the aromatic amine of the formula (II) to obtain a monoazo compound of the formula (VII),

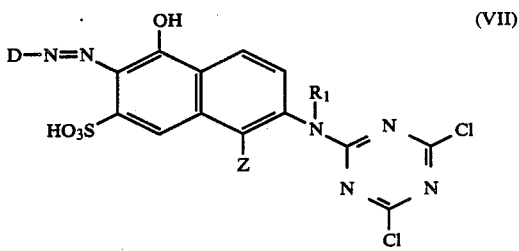
(VII)

wherein D, $R_1$ and Z are as defined above, and condensing the compound (VII) with the compound of the formula (V), or (5) condensing cyanuric chloride with the monoazo compound of the formula (IV) and a compound of the formula (VIII), $$\overset{R_2}{\underset{|}{HN}}-A-SO_2CH_2CH_2OH \qquad (VIII)$$

wherein $R_2$ and A are as defined above, in optional order to obtain a monochlorotriazinyl compound of the formula (IX),

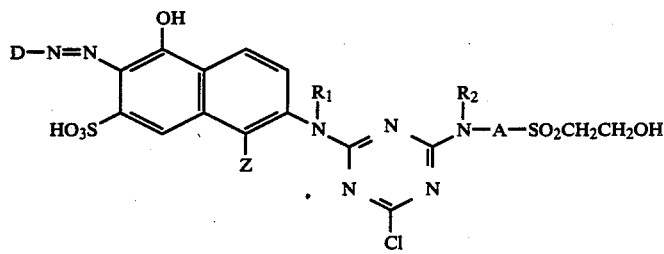

(IX)

wherein D, $R_1$, $R_2$, A and Z are as defined above, which is then esterified with an acid, or (6) condensing cyanuric chloride with compounds of the formulae (III) and (VIII) in optional order, and coupling the resulting compound with the diazonium salt of the aromatic amine of the formula (II) to obtain the monoazo compound of the formula (IX) which is then esterified with an acid.

The method for the production of the monoazo compound of the formula (I) is illustrated in more detail as follows.

As the compound of the formula (II), the following compounds are exemplified:
2-Aminobenzenesulfonic acid
2-Amino-5-methylbenzenesulfonic acid
2-Amino-5-ethylbenzenesulfonic acid
2-Amino-5-methoxybenzenesulfonic acid
2-Amino-5-ethoxybenzenesulfonic acid
2-Amino-5-chlorobenzenesulfonic acid
2-Amino-5-bromobenzenesulfonic acid
2-Amino-5-acetylaminobenzenesulfonic acid
2-Amino-5-propionylaminobenzenesulfonic acid
2-Amino-5-benzoylaminobenzenesulfonic acid
2-Amino-5-succinylaminobenzenesulfonic acid
2-Amino-5-maleinylaminobenzenesulfonic acid
2-Amino-5-nitrobenzenesulfonic acid
2-Amino-4-chlor-5-methylbenzenesulfonic acid
2-Amino-5-chloro-4-methylbenzenesulfonic acid
2-Amino-4-methoxybenzenesulfonic acid
2-Amino-4-ethoxybenzenesulfonic acid
2-Amino-4-acetylaminobenzenesulfonic acid
2-Amino-4-propionylaminobenzenesulfonic acid
2-Amino-4-benzoylaminobenzenesulfonic acid
2-Amino-4-succinylaminobezenesulfonic acid
2-Amino-4-maleinylaminobenzenesulfonic acid
3-Amino-4-methylbenzenesulfonic acid
3-Amino-4-ethylbenzenesulfonic acid
3-Amino-4-methoxybenzenesulfonic acid
3-Amino-4-ethoxybenzenesulfonic acid
3-Amino-4-chlorobenzenesulfonic acid
3-Amino-4-bromobenzenesulfonic acid
4-Amino-3-methylbenzenesulfonic acid
4-Amino-3-ethylbenzenesulfonic acid
4-Amino-3-methoxybenzenesulfonic acid
4-Amino-3-ethoxybenzenesulfonic acid
4-Amino-3-chlorobenzenesulfonic acid
4-Amino-3-nitrobenzenesulfonic acid
2-Aminobenzene-1,4-disulfonic acid
2-Aminobenzene-1,5-disulfonic acid
2-Aminobenzoic acid
2-Amino-4-methoxybenzoic acid
2-Amino-5-methoxybenzoic acid
4-Amino-4-acetylaminobenzoic acid
2-Amino-5-acetylaminobenzoic acid
2-Amino-4-sulfobenzoic acid
2-Amino-5-sulfobenzoic acid
4-Amino-2,5-dimethylbenzenesulfonic acid
4-Amino-2,5-diethylbenzenesulfonic acid
4-Amino-2,5-dimethoxybenzenesulfonic acid
4-Amino-2,5-diethoxybenzenesulfonic acid
4-Amino-2,5-dichlorobenzenesulfonic acid
4-Amino-2,5-dibromobenzenesulfonic acid
4-Amino-2-methyl-5-methoxybenzenesulfonic acid 4-Amino-2-methyl-5-ethoxybenzenesulfonic acid
2-Amino-5-methylbenzene-1,4-disulfonic acid
2-Amino-5-ethylbenzene-1,4-disulfonic acid
2-Amino-5-methoxybenzene-1,4-disulfonic acid
2-Amino-5-ethoxybenzene-1,4-disulfonic acid
2-Amino-5-acetylaminobenzene-1,4-disulfonic acid
2-Amino-5-propionylaminobenzene-1,4-disulfonic acid A substituent, $R_2$, in the compound of the formula (V), $$\overset{R_2}{\underset{|}{HN}}-A-X \quad (V)$$

includes, for example, methyl, ethyl, n-propyl, n-butyl, iso-propyl, iso-butyl, sec-butyl, tert-butyl, hydroxymethyl, 2-hydroxyethyl, 2-hydroxypropyl, 3-hydroxypropyl, 2-hydroxybutyl, 4-hydroxybutyl, 1-methyl-2-hydroxypropyl, cyanomethyl, cyanoethyl, methoxymethyl, 2-methoxyethyl, 3-methoxypropyl, ethoxymethyl, 2-ethoxyethyl, chloromethyl, 2-chloroethyl, 3-chloropropyl, 4-chlorobutyl, carboxymethyl, 2-carboxyethyl, 2-methoxycarbonylethyl, 2-ethoxycarbonylmethyl, sulfomethyl and 2-sulfoethyl groups.

The residue represented by A in the formula (V) includes, for example

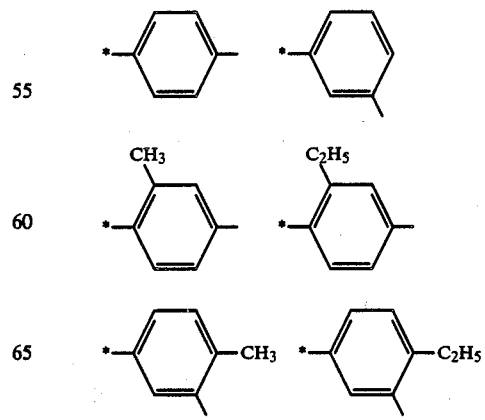

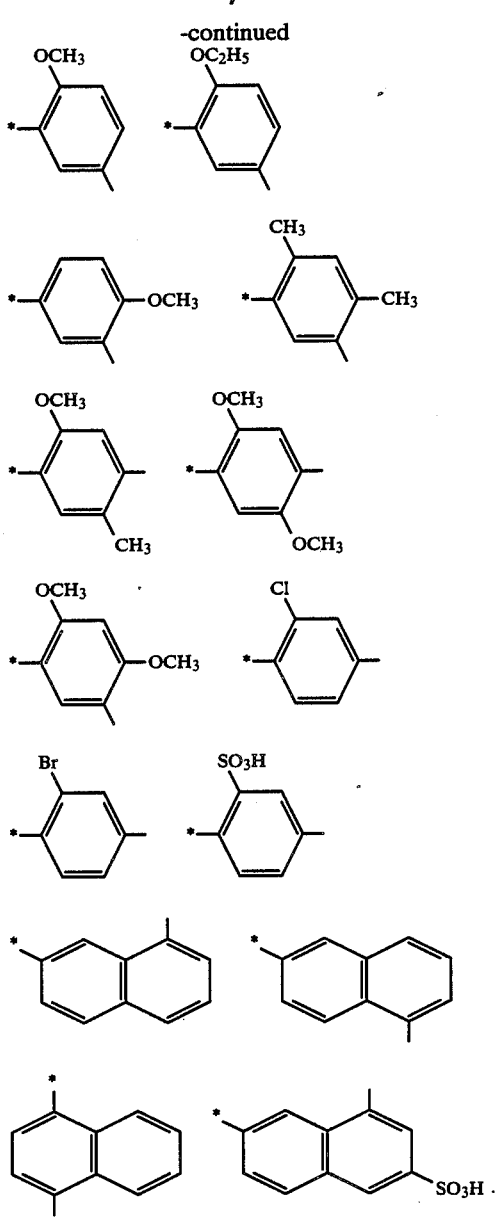

(The asterisked bond connects to —NH₂.)

In carrying out the method of the present invention, (1) the aromatic amine of the formula (II) is diazotized at −10° to 40° C. in an aqueous medium and coupled with the compound of the formula (III) while adjusting the pH to 5 to 12, preferably 6 to 10 at a temperature of −10° to 50° C., preferably 0° to 20° C., thereby to obtain the monoazo compound of the formula (IV). Alternatively, the compound (IV) may also be obtained by carrying out coupling in the same manner as above using the N-acylated product of the compound (III), and then hydrolyzing the resulting compound at 50° to 100° C. in the presence of an acid or alkali to split the acyl group.

Subsequently, the compound (IV) is subjected to first-step condensation with cyanuric chloride in an aqueous medium while adjusting the pH to 2 to 10, preferably 3 to 7 at a temperature of −10° to 50° C., preferably 0° to 30° C., thereby to obtain a dichlorotriazinyl compound, and this compound is then subjected to second-step condensation with the compound of the formula (V) while adjusting the pH to 2 to 9, preferably 4 to 6 at a temperature of 0° to 70° C., preferably 30° to 50° C., thereby to obtain the compound of the formula (I).

(2) Alternatively, the compound (I) may also be obtained by subjecting the compound (V) to first-step condensation with cyanuric chloride in an aqueous medium while adjusting the pH to 1 to 8, preferably 2 to 6 at a temperature of −10° to 40° C., preferably 0° to 20° C., and then subjecting the resulting compound to second-step condensation with the compound (IV) while adjusting the pH to 2 to 9, preferably 4 to 6 at a temperature of 0° to 70° C., preferably 20° to 50° C.

(3) Cyanuric chloride is condensed with the compounds (III) and (V) in two steps of optional order, in an aqueous medium, while adjusting the pH to 1 to 8 at −10° to 40° C. for the first-step condensation and the pH to 2 to 9 at 0° to 70° C. for the second-step condensation, thereby to obtain a monochlorotriazinyl compound of the formula (VI), and this compound is then coupled with the diazonium salt of the aromatic amine (II) while adjusting the pH to 4 to 10, preferably 5 to 9 at a temperature of −10° to 50° C., preferably 0° to 20° C., thereby to obtain the compound (I).

(4) The compound (I) may also be obtained by subjecting the compound (III) to first-step condensation with cyanuric chloride in an aqueous medium while adjusting the pH to 1 to 8, preferably 2 to 5 at a temperature of −10° to 40° C. preferably 0° to 20° C., coupling the resulting compound with the diazonium salt of the aromatic amine (II) while adjusting the pH to 4 to 10, preferably 5 to 9 at a temperature of −10° to 50° C., preferably 0° to 20° C., thereby to obtain the monoazo compound of the formula (VII), and then subjecting the compound (VII) to second-step condensation with the compound (V) while adjusting the pH to 2 to 9, preferably 4 to 6 at a temperature of 0° to 70° C., preferably 30°. to 50° C.

(5) and (6) The dye (I) may also be obtained by carrying out the above procedures using a compound of the formula (VIII) in place of the compound (V), followed by final esterification with an acid of 2 to 10 mole ratio at a temperature of 0° to 30° C. or further treatment with an alkali while adjusting the pH to 8 to 10 at 20° to 50° C.

The present compound of the formula (I) can be used for dyeing cellulose fiber materials in an orange to scarlet color of deep hue by a conventional dyeing method such as exhaustion dyeing, printing and continuous dyeing including a cold-pad-batch method.

Examples of cellulose fiber materials which can be dyed in accordance with the present invention are natural or regenerated cellulosic fibers such as cotton, flax, viscose rayon, viscose staple and the like. Exhaustion dyeing can be carried out at relatively low temperature using a dyeing bath containing sodium sulfate or sodium chloride and an acid-binding agent such as sodium carbonate, sodium tertiary phosphate or sodium hydroxide. Printing can be carried out by using a print paste containing an acid-binding agent (e.g. sodium hydrogen carbonate, sodium carbonate, sodium tertiary phosphate, sodium hydroxide), urea and a thickening agent such as preferably sodium alginate, and the printing is followed by intermediate drying and steaming or dry heating at 100° to 200° C. Further, the dyeing of the present invention may be carried out by a continuous process such as a cold-pad-batch process.

The dyes of the formula (I) of the present invention have good build-up property and produce dyed products superior in chlorine fastness (3-4 grade, ISO standard) and perspiration-light fastness. Particularly, considering that fading of dyed products due to trace amounts of active chlorine in city water frequently becomes a problem on washing at home, the dyes of the present invention superior in chlorine fastness are of high value. Also, as to perspiration-light fastness which has recently become serious with an increase in the demand for sportswear, the grade of that fastness of the present dyes is as high as 3 to 4 grade, which means that the value of the dyes is also high in this respect.

Further, the products dyed with the conventional reactive dyes are affected by acid gases in the air, which lower fastnesses with the lapse of time. But, in accordance with the present invention, such a drawback can be overcome. That is, the acid stability of dyed products obtained with the dyes of the present invention, as tested as described below, is as good as 4-5 to 5 grade: Dyed cloth is dipped in 1% acetic acid for 30 minutes and treated at 37±2° C. for 6 hours under pressure of 125 g/cm² on a perspirometer. The dyes of the present invention are also of high value in this respect.

Further, the present dyes have the following great advantages: The alkali stability is good enough to show high percent exhaustion and high percent fixation in exhaustion dyeing as well as high percent fixation in printing, and therefore dyed products of deep hue can be obtained. Besides, the present dyes are superior in washing-off property.

In exhaustion dyeing, the dyes of the present invention are little affected by change in dyeing temperature, alkali agent, amount of inorganic salt and liquor ratio, so that they have a unique performance that dyeing can be carried out with very high reproducibility.

The present invention will be illustrated with reference to the following examples, which are not however to be interpreted as limiting the invention thereto. Parts and % are by weight.

EXAMPLE 1

Cyanuric chloride (9.2 parts) is dispersed at 0° to 5° C. in a solution of a nonionic surfactant (0.1 part) in water (100 parts), and a solution of J acid (11.3 parts) in water (100 parts) produced at a pH of 7 to 8 is added dropwise at 0° to 5° C. over 1 hour. After completion of the addition, the mixture is adjusted to a pH of 3 with 20% aqueous sodium carbonate solution, and then stirred for 2 hours. Thereafter, the sulfuric ester of 1-N-ethylaminobenzene-3-$\beta$-hydroxyethylsulfone (16 parts) is added, and the mixture is heated to 40° C. while controlling the pH to 5 to 6 with 20% aqueous sodium carbonate solution, and stirring is continued at the same temperature for 5 hours.

The reaction solution is then cooled again to 0° to 5° C., and sodium hydrogen carbonate (12.6 parts) is added. A liquor prepared in advance by diazotizing 2-amino-5-methoxybenzenesulfonic acid (9.6 parts) in a usual manner is added to the above reaction solution at 0° to 5° C. over 1 hour, and stirring is continued at the same temperature for 2 hours. The pH of the reaction solution is adjusted to 5 to 6 with hydrochloric acid, and then sodium chloride (40 parts) is added to deposit crystals which are then collected on a suction-filter, washed and dried at 60° C. to obtain a dye of the formula (1),

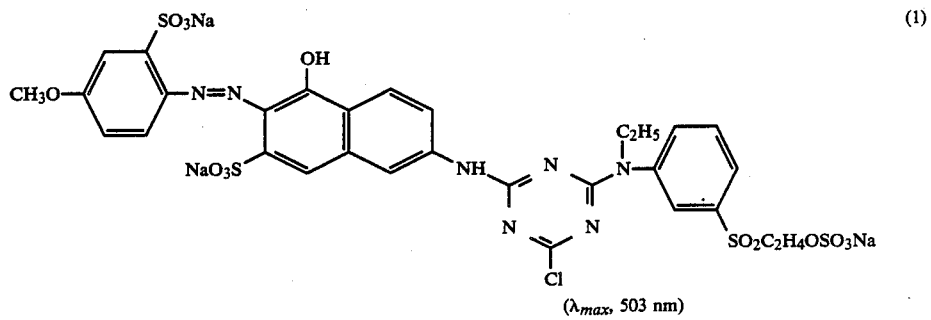

($\lambda_{max}$, 503 nm)

The dye (1) may also be synthesized by the following method: The same procedure as above is repeated, except that 1-N-ethylaminobenzene-3-$\beta$-hydroxyethylsulfone (11.4 parts) is used in place of the sulfuric ester of 1-N-ethylaminobenzene-3-$\beta$-hydroxyethylsulfone. The resulting compound is added to 100% sulfuric acid (500 parts) at 5° to 20° C. over 2 hours, and the mixture is stirred at the same temperature for 3 hours. The reaction solution is then gradually discharged into ice (1200 parts), and deposited crystals are collected by filtration. The crystals are then dispersed in water (400 parts) and dissolved by adjusting the pH to 5 to 6 with sodium carbonate. Sodium chloride (60 parts) is added to redeposit crystals which are then suction-filtered, washed and dried at 60° C.

The dye (1) (0.3 part) is dissolved in water (200 parts), and after adding sodium sulfate (20 parts) and then cotton (10 parts), the temperature is raised to 50° C. 30 Minutes thereafter, sodium carbonate (4 parts) is added, and dyeing is continued at the same temperature for 1 hour. After completion of the dyeing, the dyed cotton is washed with water and soaped to obtain a scarlet dyed product superior in chlorine fastness.

In the same manner as in Example 1, dyes producing dyed products of deep orange to scarlet color superior in chlorine fastness are obtained using the following compounds.

| Run No. | D-NH₂ (II) | Compounds of the formula (III) Z | R₁ | $\overset{R_2}{\underset{|}{HN}}$—A—X (V) |
|---|---|---|---|---|
| (2) | 2-amino-4-methoxybenzenesulfonic acid (SO₃H, NH₂, CH₃O-) | H | H | 3-(N-methylamino)phenyl-β-sulfatoethylsulfone (HN(CH₃)—C₆H₄—SO₂C₂H₄OSO₃H) |
| (3) | 2-amino-4-methoxybenzenesulfonic acid (SO₃H, NH₂, CH₃O-) | H | H | 3-(N-ethylamino)phenyl-β-sulfatoethylsulfone (HN(C₂H₅)—C₆H₄—SO₂C₂H₄OSO₃H) |
| (4) | 2-aminobenzenesulfonic acid (SO₃H, NH₂) | H | H | 3-(N-ethylamino)phenyl-β-sulfatoethylsulfone (HN(C₂H₅)—C₆H₄—SO₂C₂H₄OSO₃H) |
| (5) | 2-amino-5-methylbenzenesulfonic acid (SO₃H, NH₂, CH₃-) | SO₃H | H | 4-methoxy-3-(N-propylamino)phenyl-β-sulfatoethylsulfone (HN(C₃H₇)—C₆H₃(OCH₃)—SO₂C₂H₄OSO₃H) |
| (6) | 2-amino-5-chlorobenzenesulfonic acid (SO₃H, NH₂, Cl) | H | CH₃ | 4-methyl-3-(N-methylamino)phenyl-β-sulfatoethylsulfone (HN(CH₃)—C₆H₃(CH₃)—SO₂C₂H₄OSO₃H) |

EXAMPLE 2

Cyauric chloride (9.2 parts) is dispersed at 0° to 5° C. in a solution of a nonionic surfactant (0.1 part) in water (100 parts), and a solution containing 7-amino-4-hydroxy-3-(2-sulfo-4-ethoxyphenylazo)naphthalene-2-sulfonic acid, as synthesized from J acid (12 parts) and the diazonium salt of 2-amino-5-ethoxybenzenesulfonic acid (10.8 parts), is added dropwise over 1 hour while maintaining the pH at 4 to 5 with 20% aqueous sodium carbonate solution. The mixture is then stirred at 0° to 10° C. for 2 hours. Thereafter, the sulfuric ester of 1-N-methylaminobenzene-3-β-hydroxyethylsulfone (15 parts) is added, and the temperature is raised to 50° C. while adjusting the pH to 5 to 6 with 20% aqueous sodium carbonate solution, and the mixture is stirred at the same temperature for 6 hours. Sodium chloride (40 parts) is added to deposit crystals which are then collected on a suction-filter, washed and dried at 60° C. to obtain a dye of the formula (7),

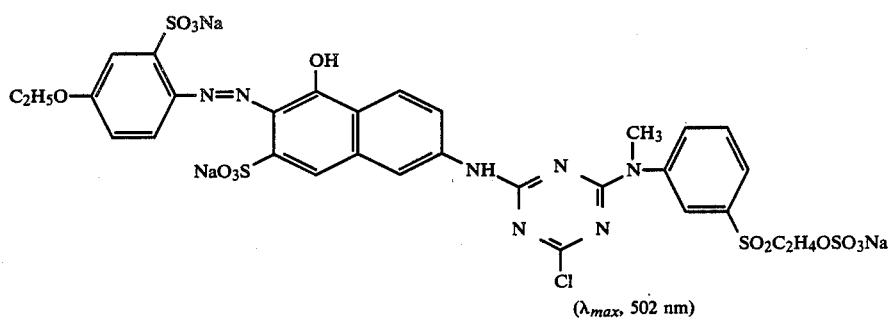

($\lambda_{max}$, 502 nm)

The dye (7) (0.3 part) is dissolved in water (150 parts), and after adding sodium sulfate (30 parts) and then cotton (10 parts), the temperature is raised to 60° C. 20 Minutes thereafter, sodium carbonate (4 parts) is added, and dyeing is carried out at the same temperature for 1 hour. After completion of the dyeing, the dyed cotton is washed with water and soaped to obtain a dyed product to deep scarlet color superior in chlorine fastness.

In the same manner as above, dyes producing dyes products of deep orange to scarlet color superior in chlorine fastness are obtained using the following compounds.

| Run No. | D-NH$_2$ (II) | Compound of the formula (III) Z | R$_1$ | HN(R$_2$)—A—X (V) |
|---|---|---|---|---|
| (8) | 2-amino-4-methoxybenzenesulfonic acid (SO$_3$H, CH$_3$O, NH$_2$) | H | H | N-ethyl-(4-methoxy-3-(β-sulfatoethylsulfonyl))aniline; HN(C$_2$H$_5$)—Ar(OCH$_3$)—SO$_2$C$_2$H$_4$OSO$_3$H |
| (9) | 2-amino-4-methoxybenzenesulfonic acid | H | H | N-methyl-4-(β-sulfatoethylsulfonyl)aniline; HN(CH$_3$)—Ar—SO$_2$C$_2$H$_4$OSO$_3$H |
| (10) | 2-amino-5-ethylbenzene-disulfonic acid (SO$_3$H, C$_2$H$_5$, NH$_2$) | SO$_3$H | H | N-methyl-3-(β-sulfatoethylsulfonyl)aniline; HN(CH$_3$)—Ar—SO$_2$C$_2$H$_4$OSO$_3$H |
| (11) | 2-ethoxy-4-amino... (OC$_2$H$_5$, HO$_3$S, NH$_2$) | H | H | N-ethyl-3-(vinylsulfonyl)aniline; HN(C$_2$H$_5$)—Ar—SO$_2$CH=CH$_2$ |
| (12) | 2-amino-4-nitrobenzenesulfonic acid (SO$_3$H, NH$_2$, NO$_2$) | H | H | N-methyl-4-(β-acetoxyethylsulfonyl)aniline; HN(CH$_3$)—Ar—SO$_2$C$_2$H$_4$OCOCH$_3$ |
| (13) | 2-methoxy-...sulfonic acid (OCH$_3$, NH$_2$, SO$_3$H) | H | H | N-isopropyl-3-(β-sulfatoethylsulfonyl)aniline; HN(CH(CH$_3$)$_2$)—Ar—SO$_2$C$_2$H$_4$OSO$_3$H |
| (14) | 2-amino-5-methoxybenzoic acid (COOH, CH$_3$O, NH$_2$) | SO$_3$H | H | N-ethyl-3-(β-phosphatoethylsulfonyl)aniline; HN(C$_2$H$_5$)—Ar—SO$_2$C$_2$H$_4$OPO$_3$H$_2$ |
| (15) | 2-amino-4-acetamidobenzoic acid (COOH, NH$_2$, NHCOCH$_3$) | H | C$_2$H$_5$ | N-ethyl-6-amino-1-(β-sulfatoethylsulfonyl)naphthalene; HN(C$_2$H$_5$)—Naph—SO$_2$C$_2$H$_4$OSO$_3$H |

EXAMPLE 3

Cyanuric chloride (9.2 parts) is dispersed at 0° to 5° C. in a solution of a nonionic surfactant (0.1 part) in water (100 parts), and a solution of J acid (11.3 parts) in water (200 parts) produced at a pH of 7 to 8 is added dropwise at 0° to 5° C. over 1 hour. After completion of the addition, the mixture is adjusted to a pH of 3 with 20% aqueous sodium carbonate solution, followed by stirring for 2 hours. Sodium hydrogen carbonate (14 parts) is then added. Thereafter, a liquor prepared by diazotizing 2-amino-5-methoxybenzenesulfonic acid (9.6 parts) in a usual manner is added at 0° to 5° C. over 1 hour, and the mixture is stirred at the same temperature for 4 hours. After adjusting the pH of the reaction mixture to 5 to 6 with hydrochloric acid, the sulfuric ester of 1-N-hydroxyethylaminobenzene-3-β-hydroxyethylsulfone (16 parts) is added. The temperature is then raised to 40° C. while adjusting the pH to 5 to 6 with 20% sodium carbonate solution, and the mixture is stirred at the same temperature for 6 hours. Sodium chloride (40 parts) is added to deposit crystals which are then collected on a suction-filter, washed and dried at 60° C. to obtain a dye of the formula (16),

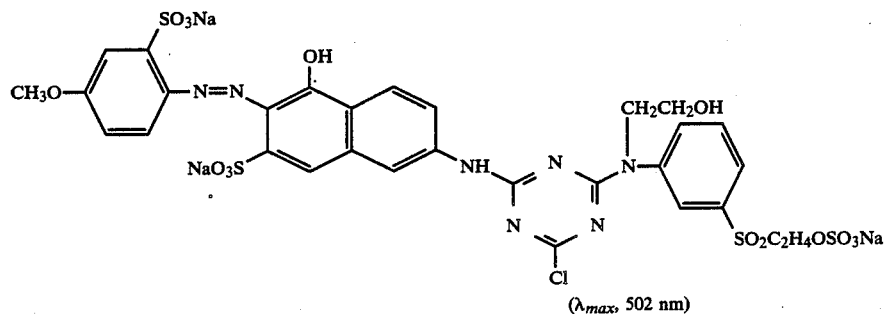

(16)

($\lambda_{max}$, 502 nm)

The dye (16) (0.3 part) is dissolved in water (300 parts), and after adding sodium sulfate (30 parts) and then cotton (10 parts), the temperature is raised to 60° C. 20 Minutes thereafter, sodium carbonate (5 parts) is added, and dyeing is carried out at the same temperature for 1 hour. After completion of the dyeing, the dyed cotton is washed with water and soaped to obtain a dyed product of deep scarlet color superior in chlorine fastness.

In the same manner as in Example 3, dyes producing dyed products of deep orange to scarlet color superior in chlorine fastness are obtained using the following compounds.

| Run No. | D—NH$_2$ (II) | Compound of the formula (III) Z | R$_1$ | $\overset{R_2}{\underset{}{HN}}$—A—X (V) |
|---|---|---|---|---|
| (17) | CH$_3$O— benzene —SO$_3$H, —NH$_2$ | H | H | CH$_2$OH on N; HN—phenyl—SO$_2$C$_2$H$_4$OSO$_3$H |
| (18) | CH$_3$O— benzene —SO$_3$H, —NH$_2$ | H | H | CH$_2$CH$_2$OH on N; HN—phenyl—SO$_2$C$_2$H$_4$OSO$_3$H (para) |
| (19) | benzene —SO$_3$H, —NH$_2$ | H | H | CH$_2$CH$_2$OH on N; HN—phenyl—SO$_2$C$_2$H$_4$OSO$_3$H |
| (20) | C$_2$H$_5$— benzene —SO$_3$H, —NH$_2$ | SO$_3$H | H | CH$_2$CH$_2$CN on N; HN—phenyl(—OCH$_3$)—SO$_2$C$_2$H$_4$OSO$_3$H |
| (21) | Cl— benzene —SO$_3$H, —NH$_2$ | H | CH$_3$ | CH$_2$CH(OH)—CH$_3$ on N; HN—phenyl—SO$_2$C$_2$H$_4$OSO$_3$H |
| (22) | C$_2$H$_5$CONH— benzene —SO$_3$H, —NH$_2$ | H | H | CH$_2$CH$_2$OCH$_3$ on N; HN—phenyl—SO$_2$CH=CH$_2$ |

-continued

| Run No. | D—NH$_2$ (II) | Compound of the formula (III) Z | R$_1$ | HN—A—X (V) with R$_2$ |
|---|---|---|---|---|
| (23) | 2-methoxy-5-sulfo-4-methylaniline (OCH$_3$, HO$_3$S, CH$_3$, NH$_2$) | H | H | R$_2$=CH$_2$CH$_2$Cl; HN-(4-methylphenyl)-SO$_2$C$_2$H$_4$OSO$_3$H |
| (24) | 2-ethoxy-5-sulfoaniline (OC$_2$H$_5$, HO$_3$S, NH$_2$) | H | H | R$_2$=CH$_2$CH$_2$OH; HN-phenyl-SO$_2$C$_2$H$_4$OCOCH$_3$ |
| (25) | 2-amino-1-sulfo-4-(maleamido)benzene (SO$_3$H, NH$_2$, NHCOCH=CHCOOH) | H | H | R$_2$=CH$_2$CH$_2$COOCH$_3$; HN-phenyl-SO$_2$C$_2$H$_4$OPO$_3$H$_2$ |
| (26) | 2-amino-4-methoxybenzoic acid (COOH, NH$_2$, OCH$_3$) | SO$_3$H | H | R$_2$=CH$_2$CH$_2$COOH; HN-phenyl-SO$_2$C$_2$H$_4$OSO$_3$H |
| (27) | 2-amino-4-(succinamido)benzoic acid (COOH, NH$_2$, NHCOCH$_2$CH$_2$COOH) | H | CH$_3$ | R$_2$=CH$_2$CH$_2$OH; HN-naphthyl-SO$_2$C$_2$H$_4$OSO$_3$H |

EXAMPLE 4

Cyanuric chloride (9.2 parts) is dispersed at 0° to 5° C. in a solution of a nonionic surfactant (0.1 part) in water (100 parts), and a solution obtained by dissolving the sulfuric ester of 1-N-hydroxymethylaminobenzene-3-β-hydroxyethylsulfone (14 parts) in water (100 parts) at a pH of 4 to 5, is added dropwise at 0° to 5° C. over 1 hour. After completion of the addition, the mixture is adjusted to a pH of 3 with 20% aqueous sodium carbonate solution, followed by stirring for 2 hours. Thereafter, J acid (11.3 parts) is added, and the temperature is raised to 40° C. while adjusting the pH of the mixture to 5 to 6 with 20% aqueous sodium carbonate solution, and stirring is continued at the same temperature for 2 hours. The reaction solution is then cooled again to 0° to 5° C., and sodium hydrogen carbonate (12.6 parts) is added. A liquor prepared by diazotizing 2-amino-5-ethoxybenzenesulfonic acid (10 parts) in a usual manner is added at 0° to 5° C. over 1 hour. After stirring at the same temperature for 2 hours, the mixture is adjusted to pH 5 to 6 with hydrochloric acid. Sodium chloride (60 parts) is then added to deposit crystals which are then collected on a suction-filter, washed with water and dried at 60° C. to obtain a dye of the formula (28), (28)

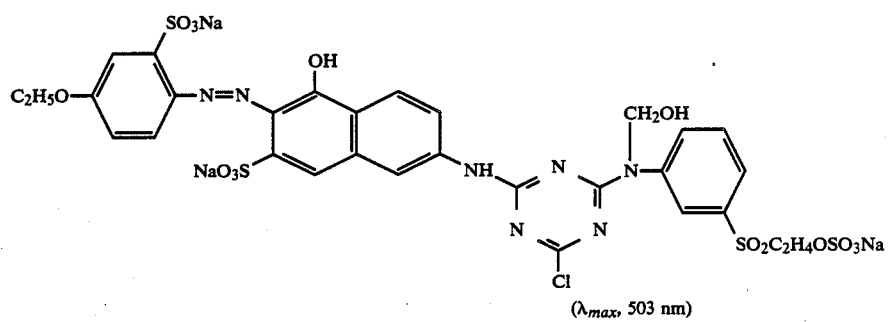

(λ$_{max}$, 503 nm)

The dye (28) (0.3 part) is dissolved in water (200 parts), and after adding sodium sulfate (30 parts) and then cotton (10 parts), the temperature is raised to 50° C. 30 Minutes thereafter, sodium tertiary phosphate (4 parts) is added, and dyeing is carried out at the same temperature for 1 hour. After completion of the dyeing, the dyed cotton is washed with water and soaped to obtain a dyed product of deep scarlet color superior in chlorine fastness.

In the same manner as in Example 4, dyes producing dyed products of deep orange to scarlet color superior in chlorine fastness are obtained using the following compounds.

|  | Parts |
|---|---|
| Dye (16) | 4 |
| Urea | 5 |
| Sodium alginate stock thickening (5%) | 50 |
| Hot water | 39 |
| Sodium hydrogen carbonate | 2 |

The print paste of the above composition is printed on mercerized cotton broad, and after intermediate drying, the cotton broad is steamed at 120° C. for 5 minutes, hot rinsed, soaped, hot rinsed and dried. Thus, a scarlet printed product superior in chlorine fastness

| Run No. | D—NH$_2$ (II) | Compound of the formula (III) Z | R$_1$ | $\overset{R_2}{\underset{|}{HN}}$—A—X (V) |
|---|---|---|---|---|
| (29) | SO$_3$H, CH$_3$O-, -NH$_2$ | H | H | CH$_2$CH$_2$CN; HN—⟨⟩—OCH$_3$; SO$_2$C$_2$H$_4$OSO$_3$H |
| (30) | SO$_3$H, CH$_3$-, -NH$_2$ | H | CH$_3$ | CH$_2$CH$_2$OH; HN—⟨⟩—CH$_3$; SO$_2$CH=CH$_2$ |
| (31) | SO$_3$H, C$_2$H$_5$-, -NH$_2$ | H | H | CH$_2$SO$_3$H; HN—⟨⟩—OCH$_3$; SO$_2$C$_2$H$_4$OSO$_3$H |
| (32) | OC$_2$H$_5$, -NH$_2$ | SO$_3$H | H | CH$_2$CH$_2$OH; HN—⟨⟩—SO$_2$C$_2$H$_4$OSO$_3$H; Cl |

EXAMPLE 5

Composition of print paste:

|  | Parts |
|---|---|
| Dye (1) | 5 |
| Urea | 5 |
| Sodium alginate stock thickening (5%) | 50 |
| Hot water | 38 |
| Sodium hydrogen carbonate | 2 |

The print paste of the above composition is printed on mercerized cotton broad, and after intermediate drying, the cotton broad is steamed at 100° C. for 5 minutes, hot rinsed, soaped, hot rinsed and dried. Thus, a scarlet printed product superior in chlorine fastness is obtained.

EXAMPLE 6

Composition of print paste:

was obtained.

What is claimed is:

1. A compound represented by a free acid of the formula,

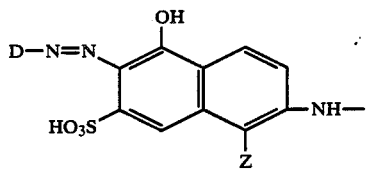

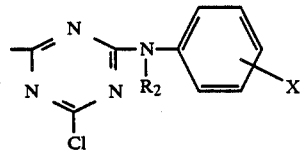

wherein D is sulfophenyl unsubstituted or substituted with 1 to 2 substituents selected from the group consisting of methyl ethyl and methoxy, R₂ is methyl, ethyl, n-propyl or 2-hydroxyethyl, X is —SO₂CH=CH₂ or —SO₂CH₂CH₂ Y in which Y is a group which is splittable by alkalis, and Z is hydrogen or sulfonic acid.

2. A compound represented by a free acid of the formula,

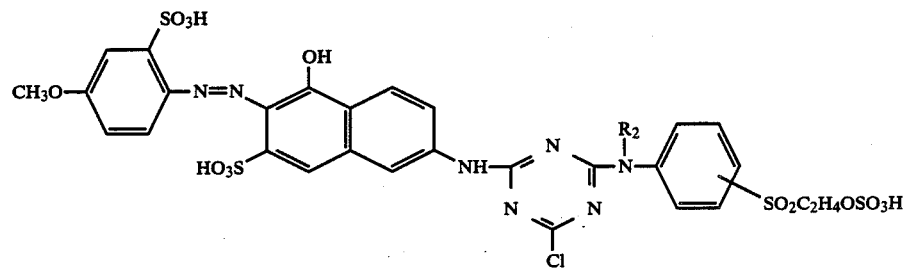

wherein R₂ is C₁₋₄ alkyl which is unsubstituted or substituted with a hydroxy, cyano, alkoxy, halogen, carboxy, alkoxycarbonyl or sulfonic acid.

3. A compound represented by a free acid of the formula,

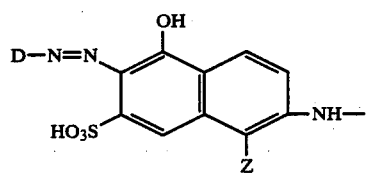

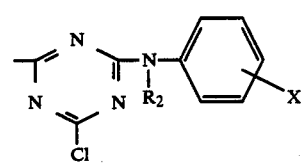

wherein D is sulfophenyl unsubstituted or substituted with 1 to 2 substituents of methyl, R₂ is methyl, ethyl, n-propyl or 2-hydroxyethyl, X is —SO₂CH=CH₂ or —SO₂CH₂CH₂ Y in which Y is a group which is splittable by alkalis, and Z is hydrogen or sulfonic acid.

4. A compound represented by a free acid of the formula,

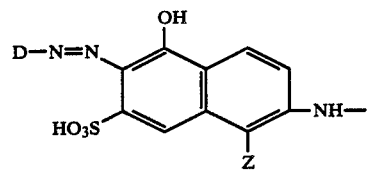

wherein D is sulfophenyl unsubstituted or substituted with 1 to 2 substituents of ethyl, R₂ is methyl, ethyl, n-propyl or 2-hydroxyethyl, X is —SO₂CH=CH₂ or —SO₂CH₂CH₂ Y in which Y is a group which is splittable by alkalis, and Z is hydrogen or sulfonic acid.

5. A compound represented by a free acid of the formula,

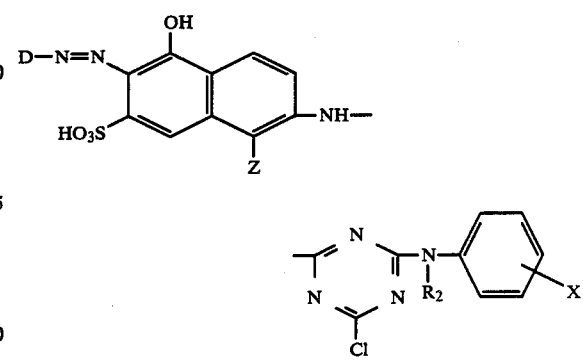

wherein D is sulfophenyl unsubstituted or substituted with 1 to 2 substituents of methoxy, R₂ is methyl, ethyl, n-propyl or 2-hydroxyethyl, X is —SO₂CH=CH₂ or —SO₂CH₂CH₂ Y in which Y is a group which is splittable by alkalis, and Z is hydrogen or sulfonic acid.

6. A compound represented by a free acid of the formula,

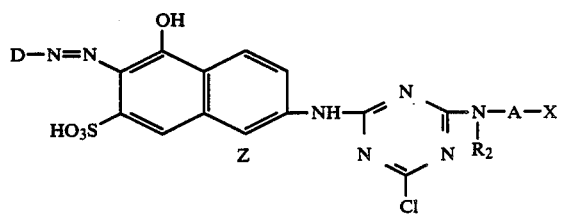

wherein D is sulfophenyl unsubstituted or substituted with one or two substituents selected from the group consisting of methyl, ethyl and methoxy, R₂ is methyl, ethyl, n-propyl or 2-hydroxyethyl, A is phenylene or naphthylene, X is —SO₂CH:CH₂ or —SO₂CH₂CH₂ Y, in which Y is a group which is splittable by alkalis, and Z is hydrogen or sulfo.

7. A compound represented by a free acid of the formula,

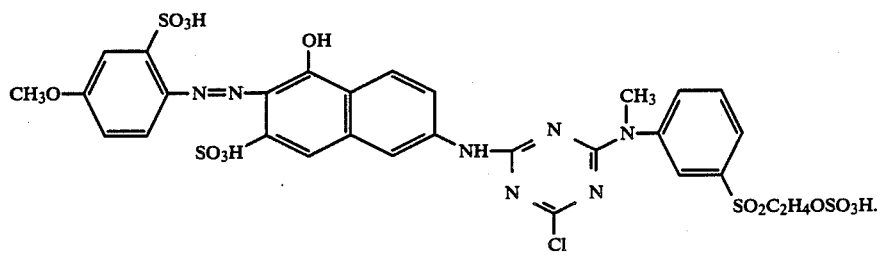
8. A compound represented by a free acid of the formula,
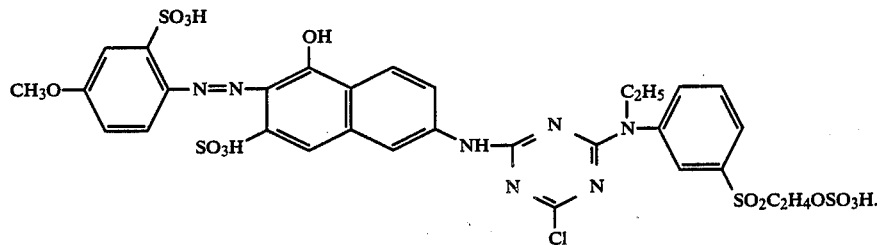
9. A compound represented by a free acid of the formula,
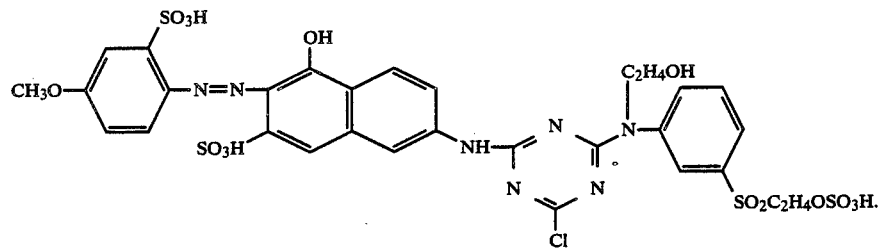
10. A compound represented by a free acid of the formula,
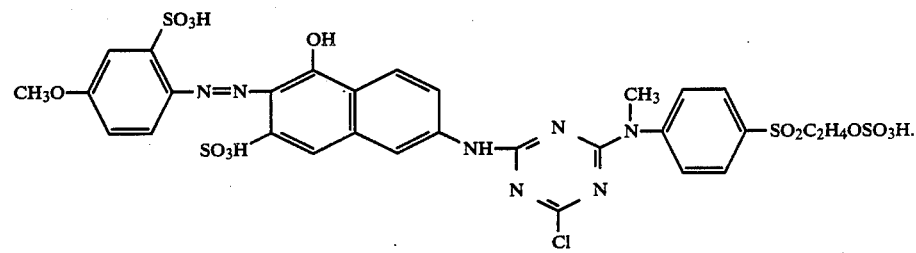
11. A compound represented by a free acid of the formula,
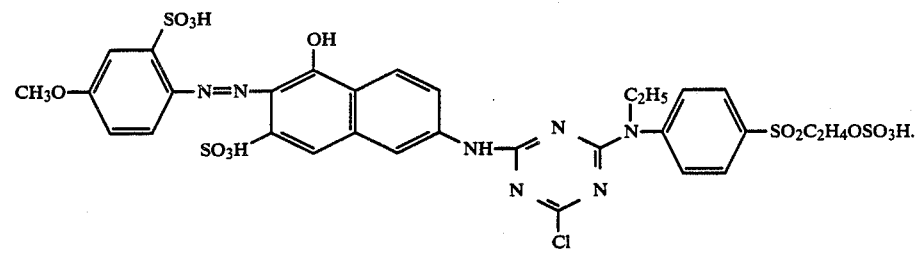
* * * * *